UNITED STATES PATENT OFFICE.

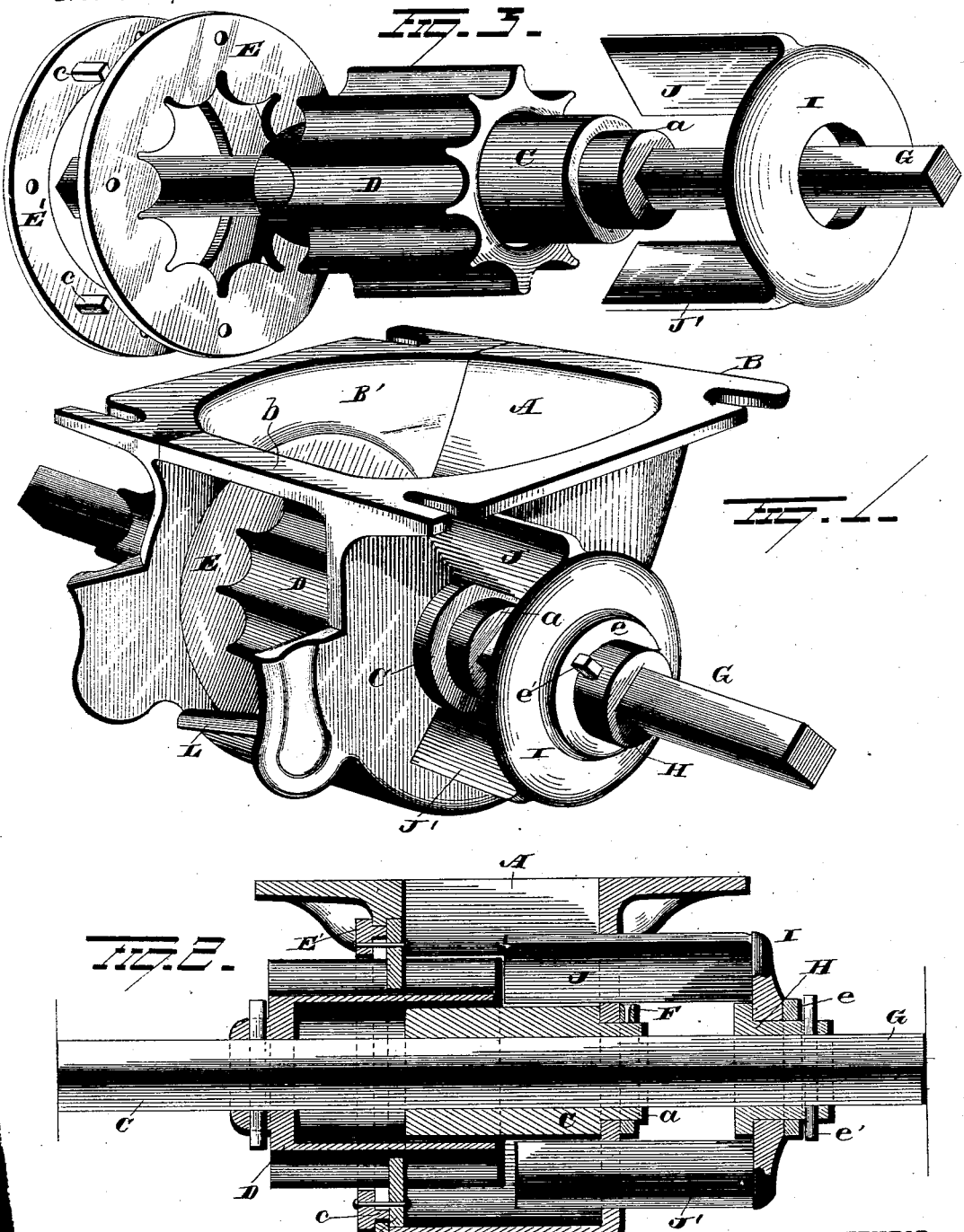

JOHN L. RITER, OF BROWNSVILLE, INDIANA.

FORCE-FEED SEEDING-MACHINE.

SPECIFICATION forming part of Letters Patent No. 310,228, dated January 6, 1885.

Application filed April 9, 1884. (Model.)

*To all whom it may concern:*

Be it known that I, JOHN L. RITER, of Brownsville, in the county of Union and State of Indiana, have invented certain new and useful Improvements in Force-Feed Seeding-Machines; and I do hereby declare the following to be a full, clear, and exact description of the invention, such as will enable others skilled in the art to which it appertains to make and use the same.

My invention relates to an improvement in force-feed seeding-machines.

Heretofore a hub or sleeve has been cast on the inside of one of the walls of a seed-cup opposite the rose-washer. As the sleeve is cast to the wall of the cup and does not revolve, the section thereof near the end of the feed-wheel cannot assist the feed-wheel in moving the seed toward the mouth of the discharge-orifice, and when only a small section of the wheel is in the cup the seed is likely to bridge, especially while feeding oats or barley, or if the seed be dirty. Again, a series of pins have been cast on a disk, the said pins passing through openings in a washer and moving over a rotating sleeve. In this device the sleeve is necessarily a part of the feed-wheel, for without the sleeve the wheel would be inoperative. This construction is defective in that the pins, which are cast integral with the disk, are liable to break if any obstruction gets into the cup, and the pins are of such form that they deliver the seed or grain over the mouth of the discharge-orifice in an uneven stream.

The object of my invention is to obviate these difficulties by providing a positive-acting-feed seeding device that will be strong and durable, and that will combine simplicity and economy in construction with efficiency in use; and with these ends in view my invention consists, first, in a force-feed seeding-machine, in the combination, with a seed-cup and a rose-washer resting in one side wall thereof, of a rotating and non-sliding sleeve, a rotating and longitudinally-adjustable fluted feed-wheel situated on said sleeve, and devices for adjusting the feed-wheel.

My invention further consists in the combination, with a seed-cup and rose-washer resting in one side wall thereof, of a rotating and non-sliding sleeve, a rotating and longitudinally-adjustable feed-wheel, an adjustable gate or gates acting in conjunction with the feed-wheel, and devices for adjusting the feed-wheel and gates.

My invention further consists in certain details in construction and combinations of parts, as will be more fully described, and pointed out in the claims.

In the accompanying drawings, Figure 1 is a view in perspective of my improved device. Fig. 2 is a view in longitudinal section of the same, and Fig. 3 is a detached perspective view of the rose-washer, feed-wheel, and cut-off gates.

A represents a seed-cup made in two sections, B B'. The section B, in the present instance, constitutes the greater portion of the cup, and the opening in the side face thereof is sufficiently large to receive the reduced end $a$ of the sleeve C, which latter rotates with the driving-shaft. This section B is also provided with slots through which the cut-off gates J J' pass, and with a rigid gate projecting downwardly and inwardly from the portion $b$ of the section B, for the purpose of preventing any grain from passing out over the feed-wheel. The other section, B', forms one side of the cup, and is provided with a large opening through which the fluted feed-wheel D is moved. The opposite faces of this section B' immediately around the opening are perfectly smooth, to form bearings, respectively, for the washer E and ring E', the former of which bears against the inner face of the section B', while the latter bears against the outer face thereof. The rose-washer E is fluted to correspond with the fluted feed-wheel D, and prevents the grain from passing out at this point, while the opening in the ring E' is sufficiently large to enable the feed-wheel to move therein without interference. This ring is provided with laterally-extending lugs $c$, which latter project through the opening in the section B' and form bearings for the rose-washer E. The rose-washer and ring are secured together and held in position by rivets or otherwise, and consequently revolve simultaneously with the fluted feed-wheel, and are prevented from binding against the section B' of the cup by the lugs c, which hold the ring and washer apart. If desired, the lugs can be formed on the rose-washer, instead of on the ring, and produce precisely the same result. The sleeve C is retained in position against displacement by the collar F, secured to the reduced end of the sleeve outside of the section B. This sleeve extends the width of the seed-chamber, and is provided with a central opening which corresponds with the shape of the shaft G. This shaft, which operates the series of feeding devices, is preferably angular, and passes through the sleeves, and is free to move longitudinally therein for the purpose of shifting the feed-wheel and gates. One end of this shaft is provided with a pinion having an opening corresponding in shape to the shaft, through which the shaft passes, and in which it is free to move longitudinally. This pinion (not shown) drives the shaft and operates all the feeding devices simultaneously.

The force-feed wheel D consists simply of a cylindrical block of metal provided throughout its entire periphery with longitudinal flutes; or it can be provided with pockets, if desired. This fluted wheel, in contradistinction to a pin feed-wheel, is complete in itself, and is not dependent in the least on the action of another part to perform its function. The feed-wheels are hollow for the greater portions of their lengths, and are each provided with reduced outer ends, by means of which they are secured to the shaft.

H is a sleeve rigidly secured to the shaft G, and provided with a flanged end, against which the collar I, provided with the gates J J', is secured. This collar is prevented from moving longitudinally by the ring e, held in place by the pin e'.

The section B' is provided with the oblique discharge-lip L, over which the grain is discharged. It is evident that by moving the shaft longitudinally the gates and feed-wheels are also moved, and the discharge-orifice opened or closed, as desired. It is evident that numerous slight changes in the construction and relative arrangement of the several parts might be resorted to without departing from the spirit of my invention; and hence I would have it understood that I do not confine myself to the exact construction shown and described, but consider myself at liberty to make such changes as fairly fall within the spirit and scope of my invention.

Having fully described my invention, what I claim as new, and desire to secure by Letters Patent, is—

1. In a force-feed seeding-machine, the combination of a seed-cup having a rose-washer through which the feed-wheel passes, a rotating and non-sliding sleeve, and a rotating and longitudinally-adjustable fluted feed-wheel, substantially as set forth.

2. In a force-feed seeding-machine, the combination of a seed-cup having a rose-washer through which the feed-wheel passes, a rotating and longitudinally-adjustable fluted feed-wheel, a rotating and non-sliding sleeve, and a gate or gates acting in conjunction with the feed, substantially as set forth.

3. In a force-feed seeding-machine, the combination of a seed-cup having a rose-washer through which the feed-wheel passes, a rotating and longitudinally-adjustable shaft, a fluted feed-wheel, and a gate or gates rigidly secured to the shaft, and a sleeve journaled to the cup and rotated by the shaft, substantially as set forth.

4. In a force-feed seeding-machine, the combination of a seed-cup having a rose-washer through which the feed-wheel passes, a rotating and adjustable feed-wheel, longitudinally-adjustable gate or gates, and a rotating and non-sliding sleeve, substantially as set forth.

5. In a force-feed seeding-machine, the combination of a seed-cup having a rose-washer through which the feed-wheel passes, a fluted feed-wheel, gate or gates for cutting off the discharge, a rotating and non-sliding sleeve, and devices for longitudinally adjusting the feed-wheel and gate or gates.

6. In a seeding-machine, the combination, with a seed-cup and a feed-wheel, of a rose-washer seated in or against the inner face of the cup, and a ring seated against the outer face of the cup, said ring and washer being secured together and embracing the feed-wheel, substantially as set forth.

7. The combination, with a seed-cup and a fluted feed-wheel, of a rose-washer located inside of the cup and embracing the feed-wheel, a ring situated outside of the cup, and provided with lugs against which the washer bears, and rivets connecting the ring and washer, substantially as set forth.

8. The combination, with a seed-cup and a longitudinally-movable shaft, of a sleeve embracing the shaft, a hollow feed-wheel secured to the shaft and overlapping the sleeve, and a gate or gates journaled to a sleeve rigidly secured to the shaft, substantially as set forth.

9. The combination, with a seed-cup having a longitudinally-adjustable shaft, of a sleeve mounted on the shaft and movably secured in one wall of the cup by a collar, a hollow feed-wheel rigidly secured to the shaft, and a gate or gates journaled on a sleeve rigidly secured to the shaft, substantially as set forth.

10. The combination, with an adjustable feed-wheel having depressions in its surface for the reception of seed, of a rotating and non-sliding sleeve acting in conjunction with the feed-wheel.

11. The combination, with an adjustable hollow feed-wheel having depressions on its outer surface, of a rotating and non-sliding sleeve acting in conjunction with the feed-wheel.

12. The combination, with a seed-cup and an adjustable feed-wheel, of a rotating sleeve journaled in one wall of the cup, substantially as set forth.

In testimony whereof I have signed this specification in the presence of two subscribing witnesses.

JOHN L. RITER.

Witnesses:
GEO. F. DOWNING,
GEORGE COOK.